Dec. 1, 1936.  C. L. WALKER  2,062,848
BRAKE FOR MOTOR VEHICLES
Filed May 15, 1931  3 Sheets-Sheet 1
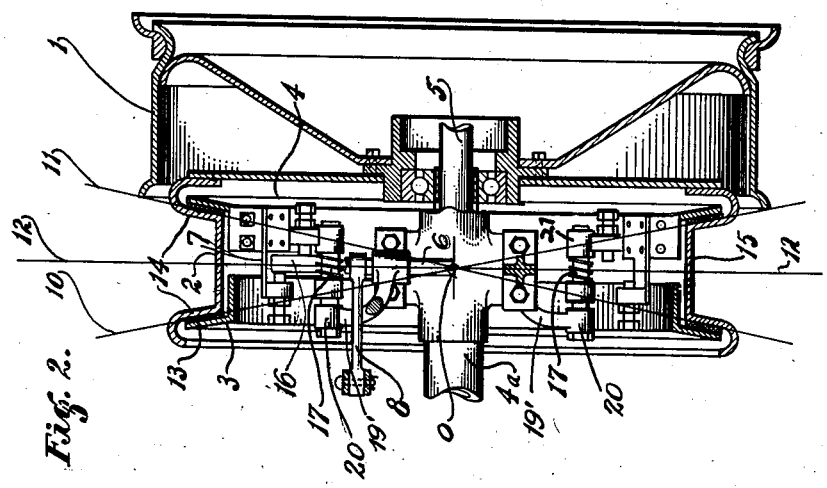
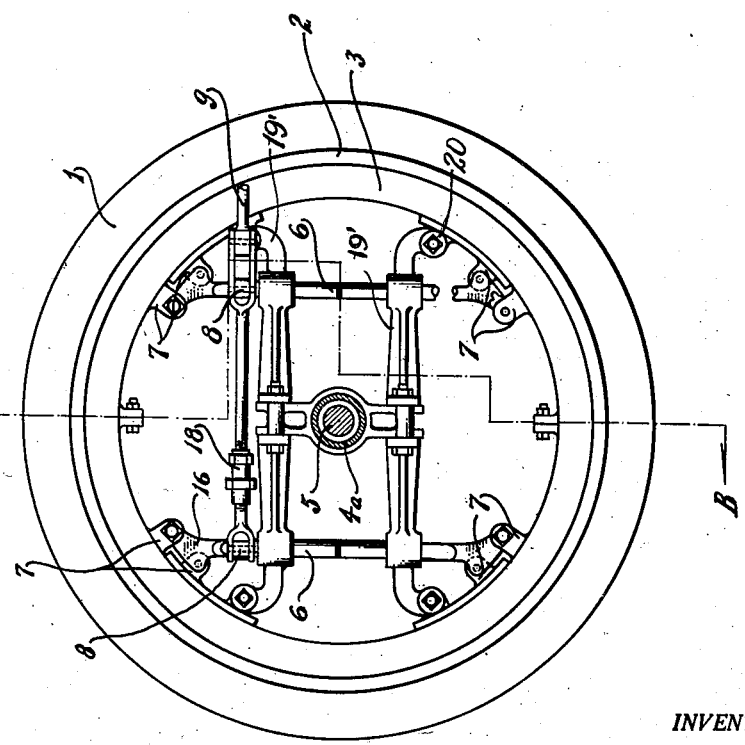
INVENTOR.
Clinton L Walker Dec. 1, 1936.  C. L. WALKER  2,062,848
BRAKE FOR MOTOR VEHICLES
Filed May 15, 1931 3 Sheets-Sheet 2
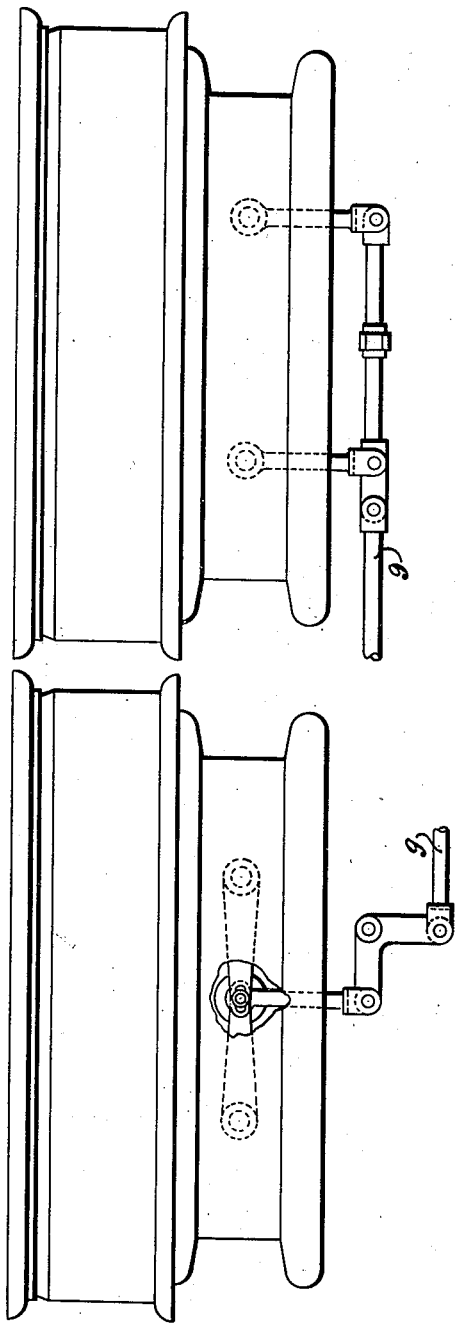
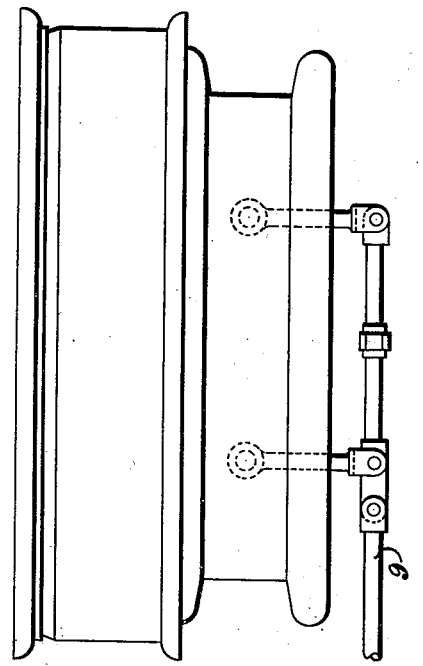
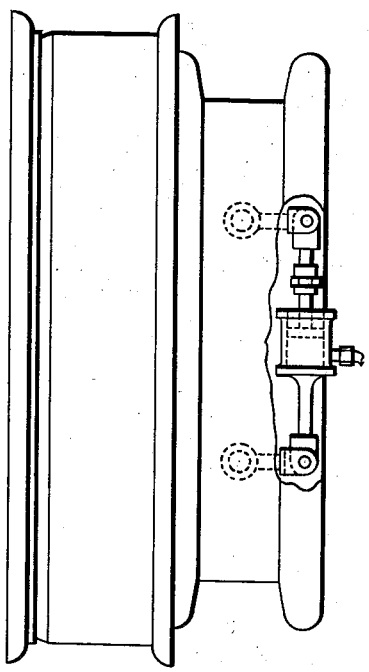
INVENTOR
Clinton L Walker Dec. 1, 1936.　　　　C. L. WALKER　　　　2,062,848
BRAKE FOR MOTOR VEHICLES
Filed May 15, 1931　　　3 Sheets-Sheet 3
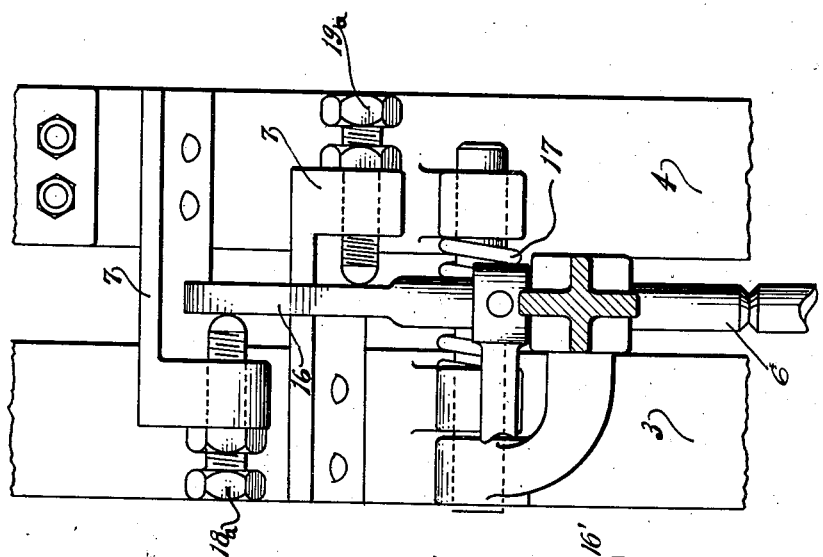
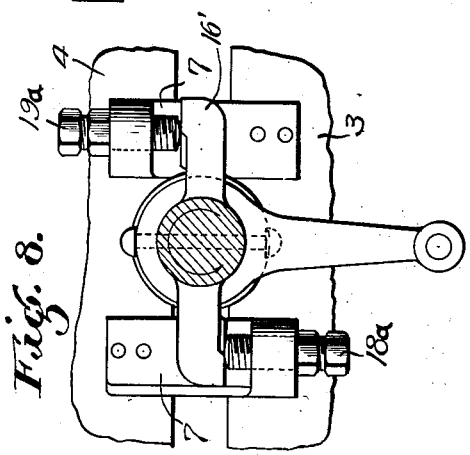
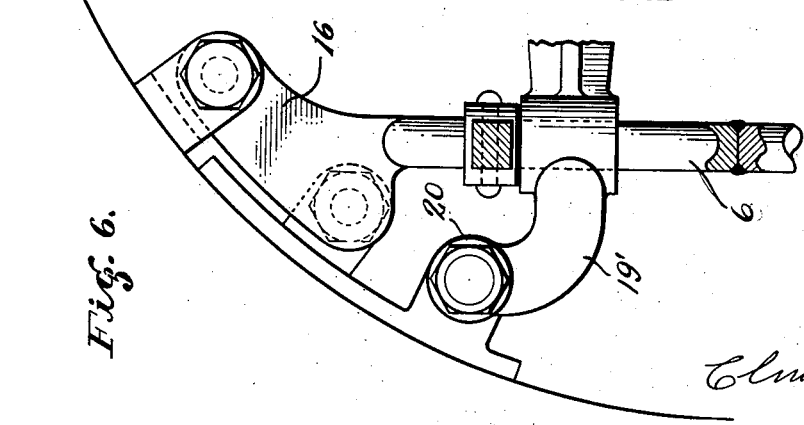
INVENTOR
Clinton L. Walker Patented Dec. 1, 1936

2,062,848

UNITED STATES PATENT OFFICE 2,062,848

BRAKE FOR MOTOR VEHICLES

Clinton L. Walker, Piedmont, Calif.

Application May 15, 1931, Serial No. 537,737

12 Claims. (Cl. 188—72)

This invention pertains to brakes and more particularly to the 4-wheel type of brakes now being used so extensively in motor vehicles. In recent years on account of a large number of women and even children operating cars it has become necessary to reduce the foot pressure required to apply the brakes to a minimum in order that feeble operators may be able to operate the cars without undue fatigue. This has made it necessary to increase the leverage in the brake applying linkages to a very high degree and especially so in the case of 4-wheel brakes with the result that the movement of the braking unit has been reduced to a small amount. In one case that the applicant examined the leverage was apparently 150 to 1, that is, one pound foot pressure would multiply to 150 pounds on the braking unit, and consequently one inch of foot pedal movement would make 1/150 of an inch movement of the braking unit. With such minute movements in the braking unit it is obvious that the clearance between the brake and the drum must be reduced to the lowest possible limit and that any expansion due to the heat of friction from a protracted application of the brake will either cause the brake to drag or will cause the braking unit to separate from the drum and thus make it necessary to depress the brake pedal an increased amount in order to apply the brake. The expansion of the drum away from the braking unit is the most common trouble in present types of brakes and the increased depression of the foot pedal required is known in the art as "losing pedal" and that term will be used to designate that phenomenon in this application.

It is the object of the present invention to eliminate the trouble arising from the contraction and expansion of the braking unit and the drum from the heat due to protracted or often repeated applications of the brake.

One form which my invention may assume is exemplified in the following description and illustrated by way of example in the accompanying drawings in which:

Fig. 1 is a side elevation of the brake showing the brake drum, one of the pair of brake shoes, the operating shafts and dogs, and a section of the brake rod and adjustment means.

Fig. 2 is a transverse section on center line A—B.

Fig. 3 is a plan showing the brake drum and the wheel rim and the brake application linkage for a front wheel.

Fig. 4 is the same as Fig. 3 excepting that it shows the linkage, brake rod and adjustment means for a rear wheel brake.

Fig. 5 is the same as 3 and 4 excepting that it shows the hydraulic means for applying the brake.

Figs. 6, 7 and 8 are details showing the means for applying the brakes and the adjustment therefor.

Fig. 8 is a detail of the brake application and adjustment means, with a slightly modified cam, in plan view and shows how lugs 7 are attached to the shoes 3 and 4, the means for adjustment by set screws 19a and that torsional rotation of shaft 6 will cause cam 16' to draw shoes 3 and 4 together.

In these figures 1 is a conventional motor vehicle wheel illustrated in this application as of the disc type; 2 is the brake drum attached by bolts or other conventional means to wheel 1; 3 is the outer and 4 is the inner of the pair of brake shoes for each wheel brake; 4a of Figs. 1 and 2 is the rear axle housing to which the brake is attached; 5 is the axle shaft, the wheel being mounted on bearings of conventional type carried ultimately by the axle housing; 6 is a pair of parallel shafts on chords to the brake drum circle carrying flat operating cams 16 at their two ends and 7 are the operating lugs engaged by the cams at the ends of shaft 6; shafts 6 and the brake supports 19¹ are supported by collar 4a on axle 5, shafts 6 being journaled in openings in brake supports 19¹; 8 are levers attached rigidly to shaft 6 and which by longitudinal movement of rod 9 impart a torsional movement in shafts 6. In the conventional type of brake where the brake shoe is inside of the brake drum, it has been found in practice that the low heat conductivity of conventional types of brake lining has prevented the brake shoe from acquiring as high a temperature from brake friction as the brake drum. Consequently the brake drum, being of a somewhat larger diameter than the metal portion of the brake shoe and on account of its higher frictional temperature, will expand away from the brake shoe thus increasing the clearance between the brake drum and the lining of the brake shoe. It is obvious that this will make it necessary for the operator to depress the brake pedal an additional amount and it frequently happens that the expansion becomes so extensive that the brake pedal will reach its lowest limit by coming in contact with the floor boards without sufficient braking pressure being applied to bring about the desired braking effect.

It is the particular object of this invention to so form the brake drum and the brake shoe that expansion will not tend to alter the clearance as between the drum and the shoe. To accomplish this the form of the drum and the shoe are such as to make them contact on radial lines 10 and 11 from the center 0 which lies in the axis of rotation of the wheel and drum and the transverse plane 12 bisecting the brake drum. Brake shoes 3 and 4 are frusta of two similar cones having one apex at point 0. These brake shoes carry brake linings of the conventional type 13 and contact with similar frusta of cones 14 of the brake drum which are connected by the cylindrical section 15 and attached to the wheel by means clearly shown in Fig. 2. As 0 is considered the center of spherical expansion, it is obvious that the surface of contact between the brake shoes 3 and 4 and the brake drum will be the truncated cones of revolution formed by the revolution about the axis of shaft 5 of lines 10 and 11, and that consequently any movement due to a difference in expansion of the shoe and the drum will make a relative movement between them along the radial lines 10 and 11 and that consequently there will be no change in shoe and drum clearance by reason of this movement. This constitutes the essential feature of this invention. To apply the brakes the shoes 3 and 4 are drawn towards each other, thus clamping them on the beveled edges of the brake shoe. It is obvious that numerous types of mechanical movement may be employed to bring these brake shoes towards each other, and hence I would not want to be limited to the particular means chosen in this application.

Brake shoes 3 and 4 are supported in position by the four pins 20 attached to brackets 19' passing through openings in lugs 21 which are attached rigidly to the brake shoes.

Brake shoes 3 and 4 carry lugs 7 with suitable adjustment means shown in the detail Figures 7 and 6 operated by cams 16 on each end of rock shafts 6. Compression springs 17 are inserted between shoes 3 and 4 to return them to their outward position after an application of the brake has been made. It will be observed that this arrangement provides four points of application around the circumference of the brake, thus assuring that the movement of the shoes is axial and thus insuring an even application of the brakes to the drum around their full surfaces of contact. To insure an even contact as between the brake and the drum, adjustment means 18 consisting of a turn buckle is placed in the brake rod connecting the operating levers 8 of shafts 6. This would apply to the brakes of the rear wheel. In addition to this, however, further adjustment means are illustrated at Figures 6 and 7, and which are relied upon entirely for the adjustment of the front wheel brakes, the lever operating means is illustrated at Fig. 3. The operation of the brake would be about as follows:

A movement of the foot pedal by the operator would impart an axial motion to rods 9, which through means of lever 8 will cause a torsional movement in shafts 6 and likewise a similar torsional movement in lugs 16, which being in contact with adjustment screws 18a and 19a of Figs. 6 and 7 will cause relative movement between shoes 3 and 4, the movement to apply the brakes being to draw 3 and 4 closer together thereby applying contact of 3 and 4 with the conical surfaces of the brake drum 14. When the foot pedal pressure is released, spring 17 will cause a return to their position of rest of 3 and 4

While I have described the use of this device as a brake, it is obvious that a similar construction may be employed by the necessary changes in detail of construction for a clutch and I would want it understood that it may be used for that purpose in addition to its use as a brake and while I have described the form of the brake drum and shoes as being frusta of cones having a common apex, it is obvious that by reason of the unequal heat of the conical sections of the brake drum and the cylindrical section connecting them that it might be found necessary or desirable to change the angle of the bevel of the conical sections of the drum and the shoes to correspond to compensate for this inequality in temperature conditions of the different parts of the drum to the end that the conical surfaces of the drum might not have a common apex. This change, if required at all, would be so slight that the surface may be considered as being essentially frusta of similar cones with a common apex as described, but I would want to have it understood that I am not to be restricted literally to similar cones with a common apex.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dicate or various uses demand.

Having thus described my invention what I claim and desire to secure by Letters Patent is:

1. A brake for motor vehicles having a brake drum consisting of a cylindrical section with beveled edges in the form of frusta of similar cones with apices at a central point in the axis of rotation and having means for attachment to the vehicle wheel, and having brake shoes of similar form and apices at the same central point and said shoes having means for lateral movement under control of the operator.

2. A brake for motor vehicles having a brake drum consisting of a cylindrical section with beveled edges in the form of frusta of similar cones with apices at a central point in the axis of rotation and having means for attachment to the vehicle wheel, and having brake shoes of similar form and apices at the same central point and said shoes having means for lateral movement under control of the operator, said means consisting of a pair of parallel shafts on equal chords to the drum circle on either side of the axis of rotation, said shafts being provided with cams at their ends and operating levers under control of the operator whereby torsional movement may be imparted to said shafts, said cams to engage lugs on the shoes whereby said shoes may be moved laterally towards each other whereby to engage the drum in braking contact and springs between said shoes to return them to their initial position after braking.

3. A brake for motor vehicles having a brake drum and brake shoes in the form of frusta of similar cones whose apices are at a central point in the axis of the axle, said drum being attached to the wheel by suitable means and said shoes having a plurality of parallel cylindrical pins mounted in brackets carried by the axle, and engaging in slidable contact lugs on the brake shoes whereby to hold the brake shoes in laterally slidable positions concentric with the axis of rotation.

4. A brake for motor vehicles having a brake drum consisting of a cylindrical section with beveled edges in the form of frusta of similar cones with apices at a central point in the axis of rotation and having means for attachment to the vehicle wheel, and having brake shoes of similar form and apices at the same central point and said shoes having means for lateral movement under control of the operator, said means consisting of a pair of parallel shafts on equal chords to the drum circle on either side of the axis of rotation, said shafts having cams at their ends and provided with operating levers under control of the operator whereby torsional movement may be imparted to said shafts, said cams to engage lugs on the shoes whereby said shoes may be moved laterally towards each other whereby to engage the drum in braking contact and springs between said shoes to return them to their initial position after braking, said lugs having means for adjusting their contact with the operating cams whereby the clearance between the brake shoes and the drum may be adjusted.

5. A brake consisting of a drum having a cylindrical section with outwardly flaring beveled edges, brake shoes to engage the beveled edges of the drum, means under control of the operator for drawing the shoes inwardly into braking contact with the drum, spring means to restore the shoes to their initial position out of contact with the drum, said means for actuating the shoes by the operator including a shaft on a chord to the drum circle carrying cams at its ends to engage lugs on the shoes whereby said shoes may be drawn into braking contact with the drum by a torsional movement of said shaft.

6. A brake consisting of a drum with means for attachment to a wheel, said drum consisting of a wide cylindrical band with symmetrical outwardly flaring beveled edges, brake shoes of similar form to the said beveled edges, means for supporting said shoes in slidable axial alignment with said bevels, means under control of the operator to draw said shoes into braking contact with the bevels, the exterior edges of said bevels being extended and curved outwardly and around so as to partially enclose said shoes whereby permitting of the addition of cover plates to enclose the braking mechanism.

7. In a brake construction, a brake drum secured to a wheel to be braked, said brake drum having a pair of frustro conical braking surfaces, the conical surfaces in which said braking surfaces lie having a substantially common apex.

8. In a brake construction, a brake drum secured to a wheel to be braked, said brake drum having a pair of frustro conical braking surfaces, the cones in which said braking surfaces lie having a substantially common apex, and frustro conical brake shoes adapted to engage said braking surfaces.

9. In a brake construction, a brake drum secured to a wheel to be braked, said brake drum having a pair of frustro conical braking surfaces, the cones in which said braking surfaces lie having a substantially common apex, and frustro conical brake shoes adapted for axial movement to engage said braking surfaces.

10. In a brake construction, a brake drum secured to a wheel to be braked, said brake drum having a pair of frustro conical braking surfaces, the cones in which said braking surfaces lie having a substantially common apex, and a pair of frustro conical brake shoes lying in similar conical surfaces adapted to engage said braking surfaces.

11. In a brake construction, a brake drum secured to a wheel to be braked, said brake drum having a cylinrical web portion and flared braking surfaces thereon, said braking surfaces lying in the surfaces of similar cones having a substantially common apex.

12. In a brake construction, a brake drum secured to a wheel to be braked, said brake drum having a cylindrical web portion and flared braking surfaces thereon, said braking surfaces lying in the surfaces of similar cones having a substantially common apex, and relatively movable brake shoes adapted to engage said braking surface.

CLINTON L. WALKER.